United States Patent

Yoshinori et al.

[11] Patent Number: 6,059,018
[45] Date of Patent: May 9, 2000

[54] VEHICLE SEAT AIR-CONDITIONING SYSTEM

[75] Inventors: Takeshi Yoshinori, Okazaki; Yuichi Kajino; Hikaru Sugi, both of Nagoya; Shinji Aoki, Kariya; Yoshimitsu Inoue, Chiryu; Hajime Ito, Kariya, all of Japan

[73] Assignee: Denso Corporation, Kariya, Japan

[21] Appl. No.: 09/114,821

[22] Filed: Jul. 13, 1998

[30] Foreign Application Priority Data

Jul. 14, 1997 [JP] Japan ................................. 9-187909
Jul. 15, 1997 [JP] Japan ................................. 9-189359

[51] Int. Cl.$^7$ .............................. F25B 29/00; B60H 1/00; B60H 3/00
[52] U.S. Cl. ................................. 165/42; 165/41; 165/43; 237/12.3 A; 237/12.3 B; 454/120; 454/907; 62/261; 62/244; 297/180.13; 297/180.14
[58] Field of Search .................................. 165/41, 42, 43; 237/12.3 A, 12.3 B; 454/907, 120; 62/261, 244; 297/180.13, 180.14

[56] References Cited

U.S. PATENT DOCUMENTS

| | | |
|---|---|---|
| 2,130,089 | 9/1938 | Hull ........................................... 62/261 |
| 2,718,839 | 9/1955 | Wilfert ...................................... 454/120 |
| 3,127,931 | 4/1964 | Johnson ........................................ 165/43 |
| 3,394,887 | 7/1968 | Megargle et al. ........................ 454/907 |
| 3,550,523 | 12/1970 | Segal ................................... 237/12.3 A |
| 4,572,430 | 2/1986 | Takagi et al. ....................... 237/12.3 A |
| 4,665,971 | 5/1987 | Sakurai ...................................... 165/43 |
| 5,042,566 | 8/1991 | Hildebrand ................................ 165/43 |
| 5,181,553 | 1/1993 | Doi ............................................. 165/43 |
| 5,385,382 | 1/1995 | Single, II et al. ...................... 454/120 |

FOREIGN PATENT DOCUMENTS

| | | | |
|---|---|---|---|
| 62-191212 | 8/1987 | Japan .................................... 454/120 |
| 5-623 | 1/1993 | Japan ...................................... 165/41 |

*Primary Examiner*—John K. Ford
*Attorney, Agent, or Firm*—Harness, Dickey & Pierce, PLC

[57] ABSTRACT

An air-conditioning case (2d) of a front air-conditioning unit (2) includes therein a branching duct (2c) for dividing the flow of the air-conditioned air to the seat (3) of occupants, and a cool/warm air switch (10) for switching the cool air (7) and the warm air (8) of the air-conditioned air and sending the resultant air to air supply ports (19). The air supply ports (19) are connected to the seat (3) by a single air duct (4). Therefore, the duct configuration is very simple. Also, the air duct (4) can be an existing one connected to the rear foot vent (30).

6 Claims, 2 Drawing Sheets

VEHICLE SEAT AIR-CONDITIONING SYSTEM

BACKGROUND OF THE INVENTION

1. Field of the Invention

The present invention relates to a vehicle seat air-conditioning system for air-conditioning the cabin by blowing out air-conditioned air from vehicle seats.

2. Description of the Invention

A conventional technique disclosed in JP-A-59-164552 is well known. This air-conditioning system is so configured that the air-conditioned air is supplied to the seats through ducts from a front duct of the vehicle and blown out from the seat surface. In this conventional system, a seat cooling air duct is connected as a branch from the face duct of the front air-conditioning unit, and a seat warming air duct is connected as a branch from the foot duct of the front air-conditioning unit. The cooling air duct and the warming air duct merge with each other and finally form a single long seat duct.

A cool/warm air switching door (damper) is arranged at the confluence of the cooling air duct and the warming air duct. As long as the front unit is in face mode, the cool/warm air switching door opens the cooling air duct and closes the warming air duct. Therefore, part of the cooling air from the face duct is supplied through the cooling air duct to the seat duct. As a result, the cooling air can be blown out of the seat.

When the front unit is in foot mode, on the other hand, the cool/warm air switching door opens the warming air duct and closes the cooling air duct, so that part of the warm air from the foot duct is supplied through the warming air duct to the seat duct. Thus, the hot air can be blown out of the seat.

The above-mentioned conventional seat air-conditioning system is so configured that the cooling air and the warming air are switched and supplied to the seat through a dedicated seat duct. The problem, however, is that a long seat duct, as well as a cooling air duct and a warming air duct switched by a door, is required as a component independent of the front air-conditioning unit. This complicates the configuration and poses the problem of higher cost and larger space required.

SUMMARY OF THE INVENTION

The object of the present invention is to provide a vehicle seat air-conditioning system in which the cooling and warming air flows can be switched and supplied to the seat with a simple structure thereby to obviate the problems of the conventional technique.

In order to achieve this object, according to the present invention, there is provided a vehicle air-conditioning system as described in the claims attached hereto.

In a vehicle seat air-conditioning system according to this invention, as in the prior art, the air-conditioning air is supplied to an occupant's seat 3 through an air duct 4 from a front air-conditioning unit 2. The configuration unique to the invention is that a branch duct 2c having an air supply port 19 connected with the downstream air duct 4 is formed in the air-conditioning case 2d of the front air-conditioning unit 2. Thus, part of the air-conditioning air, including a cooling air 7 and a warming air 8 flowing toward the front, is divided in the air-conditioning case 2d. The cooling air 7 and the warming air 8 are switched by a cool/warm air switching means 10 and supplied from the air supply ports 19 through the air duct 4 to the seat 3.

As described above, the branch duct 2c for supplying part of the front-destined air-conditioning air to the seat 3 and the cool/warm air switching means 10 for switching the cool air 7 and the warm air 8 to be supplied to the seat are all housed in the air-conditioning case 2d of the front air-conditioning unit 2. Therefore, only the air duct 4 connected to the air supply ports 19 of the air-conditioning case 2d extends from the air-conditioning case 2d to the seat 3. In this way, the ducts are greatly simplified and shortened in configuration. Also, with the air inlet 20 to the seat 3 configured in such a manner as to branch off from the existing rear air duct 4 extending to the rear foot air vent 30, no special air duct is required for the seat 3.

BRIEF DESCRIPTION OF THE DRAWINGS

The above and other objects, features and advantages will be made apparent by the detailed description taken in conjunction with the accompanying drawings, in which.

DESCRIPTION OF THE PREFERRED EMBODIMENTS

Figure 1:
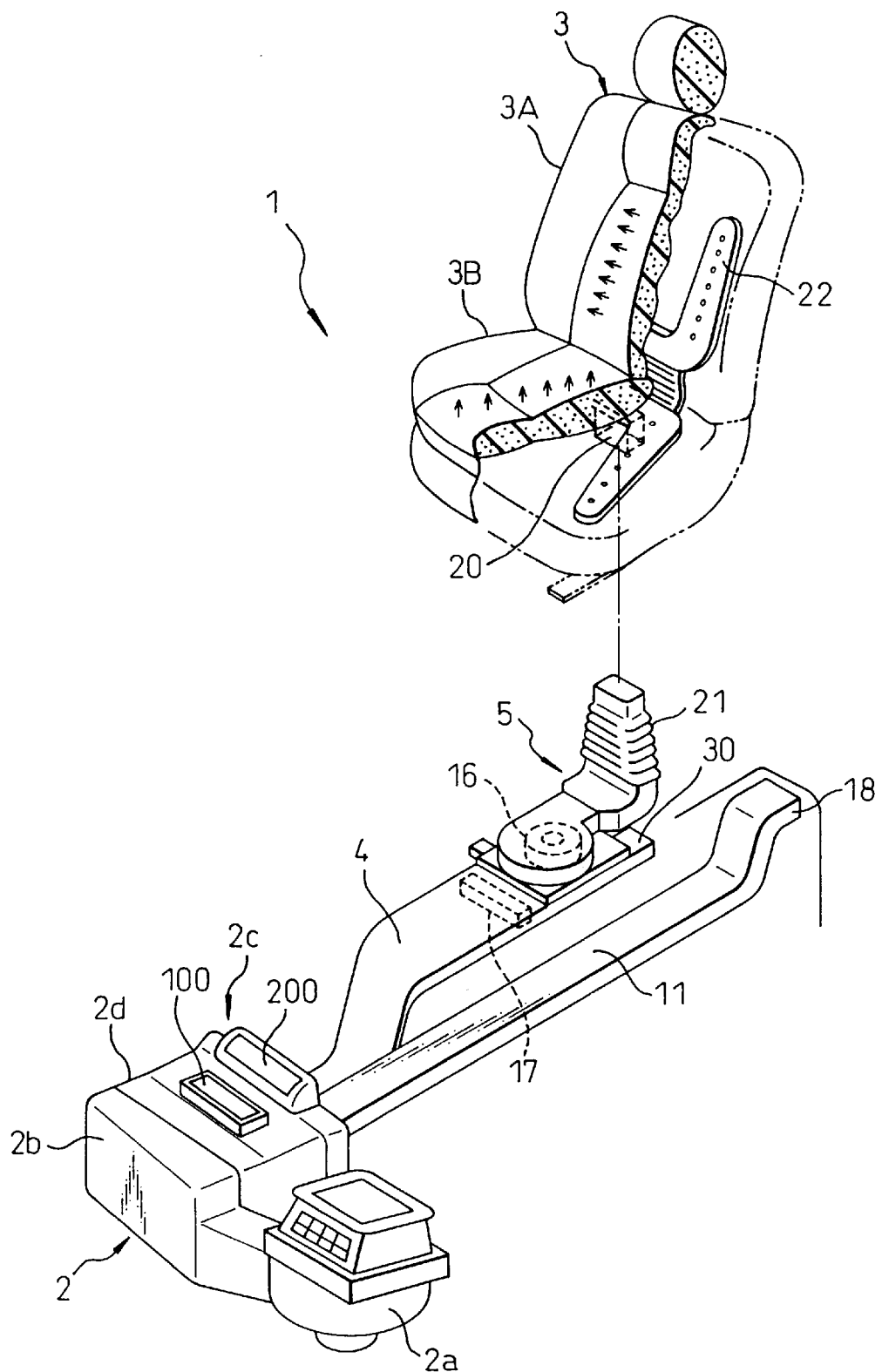
FIG. 1 is a perspective view showing a vehicle seat air-conditioning system according to an embodiment of the present invention.
Figure 2:
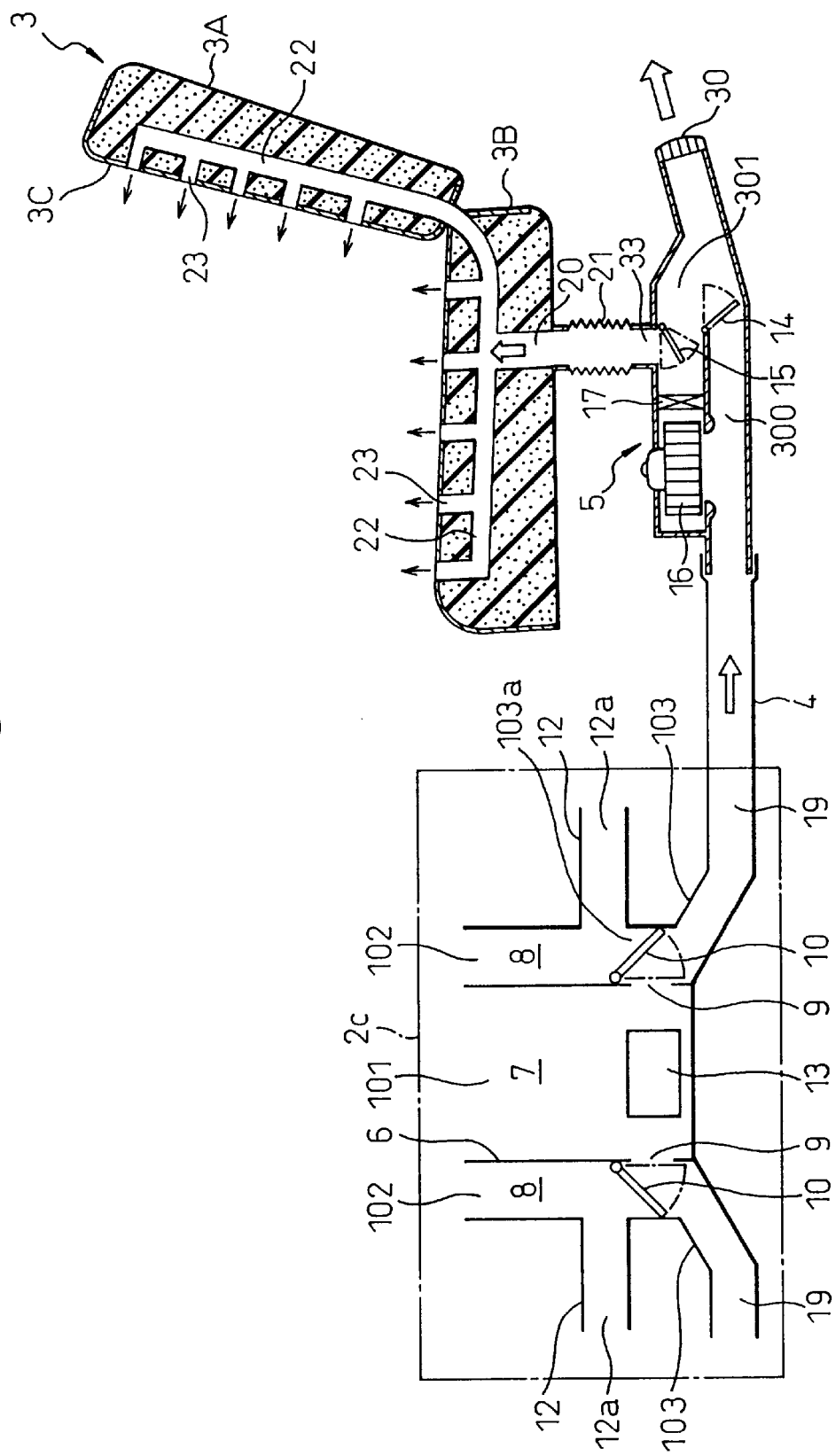
FIG. 2 is a sectional view of the essential parts according to the same embodiment.

FIG. 1 is a model diagram showing a configuration of a vehicle seat air-conditioning system according to an embodiment of the invention. FIG. 2 is a diagram schematically showing a part (a branch duct 2c) of a front air-conditioning unit 2 (hereinafter sometimes referred to as the front unit 2) and a front seat 3 as viewed forward from the rear part of the vehicle in FIG. 1. In FIG. 2, the front seat 3 is shown rotated 90° around a vertical axis to facilitate understanding. The vehicle according to this embodiment is a right-hand drive vehicle.

The air-conditioning system 1 according to this embodiment uses the functional parts of the front unit 2 of a conventional vehicle directly and is so configured as to blow out the air-conditioning air from the front seat 3. Therefore, the seat air-conditioning system 1 comprises such component parts as the front unit 2, a rear duct 4 for supplying air from the front unit 2 to the rear seat (hereinafter referred to as "the air duct" according to the invention), and a seat air-conditioning unit 5 for supplying the air-conditioning air from the air duct 4 to the front seat 3.

First, the front unit 2 will be explained. The front unit 2 has an air-conditioning case 2d, made of plastic, which constitutes an air path into the cabin.

The front unit 2 is roughly divided into a blower unit 2a and an air-conditioning unit 2b as shown in FIG. 1. The blower unit 2a is well known and has built therein an air-conditioning fan (not shown). An internal-external air switching box is arranged upstream of the air. The blower unit 2a is arranged offset toward the front occupant seat from the center of the vehicle width, so that the air sucked in from the cabin is pressured and blown out into the air-conditioning unit 2b along the vehicle width.

The air-conditioning unit 2b has built therein an evaporator (not shown) constituting a cooling heat exchanger and a heater core constituting a heating heat exchanger downstream of the evaporator. The air-conditioning unit 2b is thus arranged at the center of the vehicle width. The evaporator and the heater core are arranged in juxtaposition along the vehicle length. The direction of flow of the air sent from the blower unit 2a changes rearward in the air-conditioning unit 2b. In the air-conditioning unit 2b, a well-known air mix door (not shown) constituting an air-conditioning air temperature regulating member is arranged between the evaporator and the heater core.

A defroster air nozzle 100 is formed at the upper part of the air-conditioning unit 2b for blowing the air-conditioned air to the inner surface of the front glass of the vehicle. This defroster air nozzle 100 communicates with a defroster duct not shown.

The air-conditioning case 2d of the air-conditioning unit 2b includes therein a branching duct 2c on the side of defroster air nozzle 100 on the rear part of the vehicle for blowing the air-conditioned air to the upper half body and the lower half body of the occupants and into the seat 3.

The branching duct 2c is made of plastic and is formed in such a manner that the flow path thereof extends vertically as shown in FIG. 2. The branching duct 2c has a face intake (not shown) for introducing the air-conditioned air toward the upper half body of the occupants. The face intake is opened upward of the branching duct 2c. The air-conditioned air that has flowed into the face duct not shown from the face intake flows partly upward and is sent to the front face air nozzle 200 for blowing out the air-conditioned air toward the upper half body of the occupants in the front seats. The other part of the air-conditioned air that has flowed into the face duct branches downward and is sent to the rear face duct 101 (hereinafter referred to as the upper half body duct according to the invention) shown in FIG. 2.

The rear face duct 101 is for sending the air-conditioned air toward the upper half body of the occupants in the rear seat and is formed in such a manner that the flow path thereof extends downward at the central portion of the vehicle width. The most downstream portion of the rear face duct 101, as shown in FIG. 2, has an open rear face air nozzle 13 constituting a connector to the rear face duct 11.

The rear face duct 11 is connected to the rear face duct 101, and arranged to extend along the vehicle length at the central portion of the vehicle width. The extreme end of the rear face duct 101 is opened toward the upper half body of the occupants in the rear seat as a rear face air vent 18.

A foot duct 102 of such a shape as shown in FIG. 2 (hereinafter referred to as "the lower half body duct" in the invention) is arranged on each side of the rear face duct 101 of the branching duct 2c. In this way, the rear face duct 101 and the foot ducts 102 are arranged in juxtaposition in proximity to each other along the vehicle width.

A foot intake not shown is formed in juxtaposition with the face intake at the upper end of the foot duct 102. The foot duct 102 branches into two left and right portions from the foot intake as shown in FIG. 2, each including a front foot duct 12 for blowing the air-conditioned air toward the lower half body of the left and right occupants of the front seat and a rear foot duct 103 for blowing the air-conditioned air toward the lower half body of the occupants of the rear seat.

The downstream end of the front foot duct 12 on the right side in FIG. 2 constitutes a right foot air nozzle 12a for blowing out the air-conditioned air toward the feet of the occupant of the right front seat. The downstream end of the front foot duct 12 located on the left side in FIG. 2, on the other hand, constitutes a left foot air nozzle 12a for blowing out the air-conditioned air to the feet of the occupant of the left front seat. The rear foot air supply ports 19 at the end of the left and right rear foot ducts 103 are each connected with the rear duct 4, so that the air-conditioned air blown toward the rear foot duct 103 can be sent toward the feet of the occupants of the rear seat from the air vent 30. The rear face duct 101 and the rear foot ducts 103 share part of the duct wall 6.

The air-conditioned air blown toward the upper half body or the lower half body of the occupants is switched by an air nozzle switching door not shown. As an example, assume that the air nozzle switching door opens the face air intake while at the same time closing the foot air intake, thus switching to the face mode. The air-conditioned air is introduced from the face intake into the face duct and sent to both the front face air nozzle 200 (FIG. 1) and the rear face duct 101.

On the other hand, assume that the air nozzle switching door closes the face air intake while opening the foot air intake, thus switching to the foot mode. The air-conditioned air is sent from the foot duct 102 to both the front foot duct 12 and the rear foot duct 103. In this way, the front unit 2 according to this embodiment can blow the air-conditioned air to the occupants of both front and rear seats.

The front unit 2 incorporated in a well-known automotive air-conditioner is controlled automatically to set the cabin temperature automatically by adjusting the temperature of the air-conditioned air based on the air-conditioning environmental information including the environmental temperature, the internal temperature, a temperature setting, etc. Further, the operation mode of the air nozzle is automatically switched based on the above-mentioned air-conditioning environmental information.

Assume that this automatic regulation is working when the air nozzle is in face mode. The cabin is cooled, and therefore, as shown in FIG. 2, a cool air 7 flows through the rear face duct 101. The rear face duct 101 thus acts as a cool air path. In the case where the air nozzle is in foot mode, in contrast, the cabin is normally warmed. Therefore, a warm air 8 flows through the foot ducts 102, which constitute a warm air path.

Not only the warm air 8 but also the cool air 7 can be introduced into the rear duct 4 according to this embodiment. Specifically, as shown in FIG. 2, the portion of the rear foot duct 103 branching off from the foot ducts 102 immediately downstream of the air intake 103a is formed with holes 9 communicating with the rear face duct 101. The holes 9 are opened or closed by the doors (dampers) 10. The doors 10 selectively open or close the communication holes 9 and the foot ducts 102. When the doors 10 open the communication holes 9, the cool air 7 is introduced from the rear face duct 101 into the rear foot duct 4.

In the case where the doors 10 close the communication holes 9 and the air intake ports 103a from the foot ducts 102 of the rear foot ducts 103 at the same time, on the other hand, the warm air 8 from the foot ducts 102 is introduced into the rear duct 4.

Now, the seat 3 and the seat air-conditioning unit 5 will be explained.

The seat 3 includes a seat back 3A and a seat proper 3B. The portions 3A, 3B are covered with an air-permeable surface material 3C. The seat back 3A and the seat proper 3B have formed therein an air path 22 for introducing the air-conditioned air from the seat air-conditioning unit 5. Seat air vents 23 are provided at the downstream side of the air path 22.

The lower end of the seat proper 3B is formed with an air inlet 20 leading to the air path 22. The air inlet 20 is connected to a contractible accordion duct 21. The accordion duct 21 permits the seat 3 to slide longitudinally of the vehicle. Also, when the seat 3 slides, the accordion duct 21 is deformed thereby to prevent the seat 5 from coming off from the air inlet of the air inlet 20 of the seat and the seat air-conditioning unit 5.

The seat air-conditioning unit 5 is arranged to communicate with the lower end of the accordion duct 21. In the seat air-conditioning unit 5, the rear duct 4 branches into two parts thereby to form a first air path 300 and a second air path 301 horizontally parallel to each other. The portions downstream of the first air path 300 and the second air path 301 merge with each other to form a rear foot vent 30 for blowing out the air-conditioned air to the feet of the occupants in the rear seat. The accordion duct 21 is also connected to the opening 33 downstream of the second air path 301.

A blower 16 is arranged at the upstream portion of the second air path 301. This blower 16 is for increasing the capacity of the air-conditioned air blown out from the seat 3 and that blown out of the rear foot vent 30.

The second air path 301 has arranged therein a door 15 for opening and closing the opening 33 for connecting to the accordion duct 21. The door 15 is for selectively opening or closing the opening 33 and the downstream end of the second air path 301.

The first air path 300 has arranged therein a door 14, by which the first air path 300 is opened or closed. The doors 14, 15 are adapted to be driven either interlocked with or independently of each other by a servo motor not shown. The servo motor is controlled by an air-conditioning control unit not shown. In FIGS. 1 and 2, only the portion of the seat air-conditioning unit 5 on the right side of the vehicle is shown. Actually, however, the portion of the seat air-conditioning unit 5 on the left side of the vehicle is constructed in a similar fashion.

Now, an explanation will be given of the operation of the front unit 2 and the seat air-conditioning unit 5 according to an embodiment of the invention.

First, assume that the front unit 2 is in face mode and the vehicle is in what is called the cool-down state in which the cabin interior is required to be cooled rapidly as in the case where the vehicle is parked in the summer. The air-conditioning operation is set in seat cool mode.

In seat cool mode, the control unit drives the doors 10 automatically to the position indicated by solid line in FIG. 2, so that the communication holes 9 are opened and the air intake ports 103a are closed. As a result, the cool air 7 from the rear face duct 101 is prevented from flowing into the front foot ducts 12. This cool air 7 is sent to the read duct 4 through the rear foot ducts 103 and the rear foot air supply ports 19.

In this cool-down state, the downstream end of the first air path 300 is closed by the door 14, while the opening 33 is opened by the door 15. At the same time, the downstream end of the second air path 301 is closed. As a result, the cool air sucked in from the front unit 2 by the blower 16 flows entirely as air-conditioned air through the accordion duct 21.

In the above-mentioned cool-down state, the cool air blown out of the seat gives a comfortable feeling to the occupants. When the cool air is blown from the seat 3 in the steady state where the cabin interior is sufficiently cool, however, the cool air that is directly blown out to the human skin makes the occupants feel uncomfortably cool.

In view of this, when the cabin is sufficiently cooled into steady state in face mode, the mode is changed to seat blow mode. In seat blow mode, the communication holes 9 are closed by the doors 10 and the air intake ports 103a of the rear foot ducts 103 are opened. At the same time, the door 15 is set at a similar position to the cool down state, while the door 14 is opened. Consequently, the blower 16 sucks in the cabin air (say, about 25° C.) from the area around the feet of the occupants in the rear seat by way of the rear foot vent 30. Also, the cabin air is sucked in from the area around the feet of the occupants in the front seat by way of the front foot air nozzle 12a. As a result, the cabin air, not the cool air 7 that has passed through the evaporator, is blown out from the seats. Thus the occupants feel no discomfort but enjoy a good air-conditioned feeling.

In the case where the front unit 2 is in foot mode, on the other hand, the communication holes 9 are closed by the doors 10 while the air intake ports 103a are opened. Thus, the warm air 8 is introduced into the rear duct 4 through the rear foot ducts 103 and the rear foot air supply ports 19. Now, the seat warm mode can be started.

In seat warm mode, the downstream end of the second air path 301 is closed by the door 15, while at the same time closing the downstream end of the first air path 300 by the door 14. As a result, the warm air 8 that is sucked into the blower 16 through the rear duct 4 is sent only to the accordion duct 21 for the seat air-conditioning operation.

In the case where it is desired to warm the rear seat first in foot mode, the inlet opening 33 of the accordion duct 21 is closed by the door 15 and the outlet of the second air path 301 is opened. At the same time, the outlet of the first air path 300 is closed by the door 14. Thus, the warm air sucked into the blower 16 is sent to the rear foot vent 30.

In the case where it desired to warm the seat and the feet of the occupants of the rear seat at the same time, on the other hand, the door 15 is moved to the position for opening both the inlet opening 33 of the accordion duct 21 and the downstream end of the second air path 301. At the same time, the downstream end of the first air path 300 is closed by the door 14. As a result, the warm air 8 is sent to the rear foot air vent 30 and the accordion duct 21 at the same time thus making it possible to warm the seat and the feet of the occupants of the rear seat at the same time.

In this foot mode, it is recommended that the seat warm mode, the rear seat foot warm mode, and the seat/rear seat foot warm mode can be switched selectively as desired by a switch on the air-conditioning operation panel not shown.

As described above, according to this embodiment, the doors 10 (cool/warm air switching means) for switching the cool air 7 and the warm air 8 are arranged in the air-conditioning case 2d (air-conditioning unit 2b), thus providing simple cool/warm air switching means utilizing the existing rear face duct 101 and the foot ducts 102 arranged in the unit. As a result, without new ducts (intake ducts for the cool air 7 and the warm air 8), the cool air 7 and the warm air 8 can be switched and sent to the rear seat 3 with a simple configuration.

According to this embodiment, the rear duct 4 is shared by the seat air-conditioning operation and the warming of occupants in the rear seat operation. Therefore, two functions can be performed with a single duct. Consequently, the ducts can be laid and connected easily and the installation space can be reduced.

This invention is applicable also to various embodiments described below.

In the above-described embodiments, the rear face duct 101 is laid for blowing the air toward the upper half part of the body of the occupants in the rear seat. As an alternative, the cool air can be blown toward the upper half part of the body of the occupants in the front seat.

Also, according to the above-mentioned embodiments, the air-conditioned air is blown to the front seat 3. Instead, the air-conditioned air can be blown to the rear seat with equal effect.

In each of the above-described embodiments, an electric heater (such as a PTC element) 17 may be arranged downstream or upstream of the blower 16 to increase the temperature of the air-conditioned air sent to the seat 3 and the temperature of the air-conditioned air blown out of the rear foot air vent 30.

What is claimed is:

1. A vehicle seat air-conditioning system (1) for supplying an air-conditioned air from a front air-conditioning unit (2) through an air duct (4) to a seat (3), wherein said front air-conditioning unit (2) includes:

an air-conditioning case (2d) including a branching duct (2c) having air supply ports (19) connected to said air duct (4), and;

cool/warm air switching means (10) arranged in said air-conditioning case (2d) for switching between a cool air (7) and a warm air (8) and supplying the resulting air to said air supply ports (19);

wherein said branching duct (2c) includes a lower half body duct (102) for blowing the temperature-controlled warm air (8) to ward the lower half body of the occupants and an upper half body duct (101) for blowing the temperature-controlled cool air (7) toward the upper half body of the occupants;

wherein said cold/warm air switching means (10) switches said air duct (4) to selected one of the upper half body duct (101) and the lower half body duct (102);

wherein said upper half body duct (101) is a rear face duct for blowing the cool air toward the upper half body of the occupants of the rear seat, wherein said lower half body duct (102) is branched and connected to front foot ducts (12) for blowing the warm air toward the occupants of the front seat and rear foot ducts (103) for blowing the warm air toward the occupants of the rear seat, and wherein said air duct (4) is connected to said rear foot ducts (103) at said air supply ports.

2. A vehicle seat air-conditioning system according to claim 1, wherein said rear face duct (101) and said rear foot ducts (103) are arranged in proximity to each other to share a part of a duct wall (6), wherein said duct wall (6) is formed with holes (9) for communicating between said rear face duct (101) and said rear foot ducts (103), and wherein said path switching means (10) switches between seat cool mode and seat warm mode, the seat cool mode being such that said communication holes (9) are opened so that the cool air (7) of said rear face duct (101) is introduced to the rear foot ducts (103) and the cool air (7) is blocked from flowing into said front foot ducts (12), the seat warm mode being such that said communication holes (9) are closed so that the warm air (8) is introduced to the rear foot ducts (103).

3. A seat air-conditioning system according to claim 1, wherein said air duct (4) is an existing one, and an air inlet (20) to said seat (3) from said existing air duct (4) is branched.

4. A seat air-conditioning system according to claim 3, further comprising a blower (16) for applying additional pressure to the air-conditioned air supplied to said seat (3) and said air inlet (20) branching to said seat (3).

5. A seat air-conditioning system according to claim 2, wherein said air duct (4) is an existing one, and an air inlet (20) to said seat (3) from said existing air duct (4) is branched.

6. A seat air-conditioning system according to claim 5, further comprising a blower (16) for applying additional pressure to the air-conditioned air supplied to said seat (3) and said air inlet (20) branching to said seat (3).

* * * * *